J. C. Raymond,
Sails & Rigging.
N° 59,264. Patented Oct. 30, 1866.
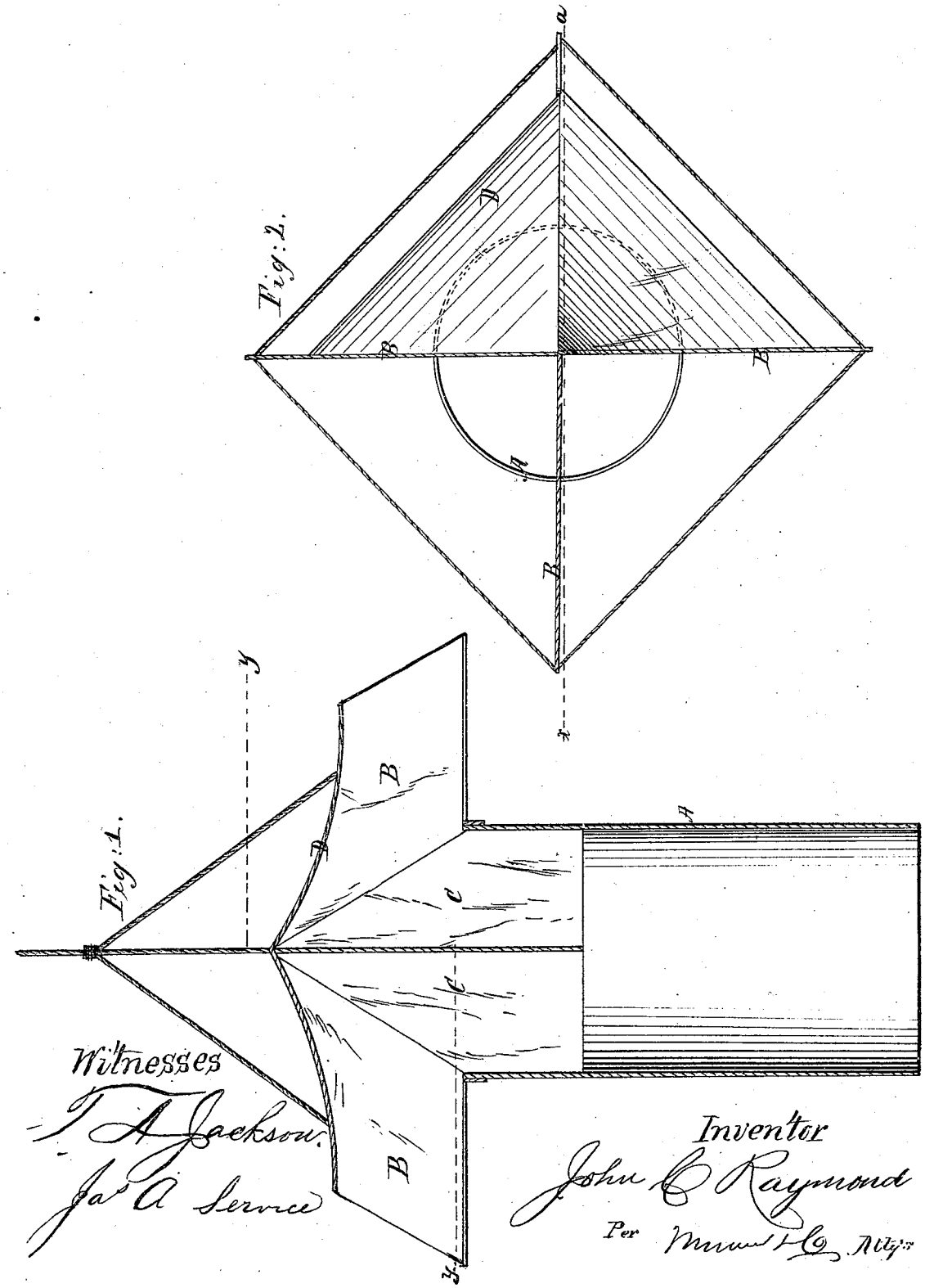
Witnesses
T. A. Jackson
Jas. A. Service
Inventor
John C. Raymond
Per Munn & Co., Atty's

UNITED STATES PATENT OFFICE.

JOHN C. RAYMOND, OF GREEN POINT, NEW YORK.

IMPROVED WIND-SAIL.

Specification forming part of Letters Patent No. 59,264, dated October 30, 1866.

*To all whom it may concern:*

Be it known that I, JOHN C. RAYMOND, of Green Point, Kings county, State of New York, have invented a new and useful Improved Wind-Sail; and I do hereby declare that the following is a full, clear, and exact description thereof, which will enable others skilled in the art to make and use the same, reference being had to the accompanying drawings, forming a part of this specification, in which—

Figure 1 represents a vertical central section of this invention, taken in the plane indicated by the line $x$ $x$, Fig. 2. Fig. 2 is a horizontal section of the same, the line $y$ $y$, Fig. 1, indicating the plane of section.

Similar letters of reference indicate like parts.

This invention relates to a wind-sail which is provided with four wings, so that the same is capable of catching the wind from whatever quarter the same may blow, and the time and labor generally required for setting the wind-sail are saved. Said wind-sail is provided with a top which extends beyond the barrel, so that the sail need not be taken in when it rains.

A represents the barrel of my wind-sail, which is made of canvas or any other suitable material, in the ordinary manner.

This barrel is provided with four wings, B, which extend from gores C, that are fastened together in the center and to the inner circumference of the barrel, as clearly shown in Fig. 1 of the drawings.

These gores are cut out so that their lower or inner parts are quite slack, and if the wind strikes one of the wings the appropriate gore is expanded, and the space through which the wind passes down in the barrel is enlarged, and a sufficient quantity of fresh air is caught by the wind-sail and conveyed down into the vessel from whatever quarter the wind may blow.

The upper edges of the wings B are connected to the top D, and this top extends on all sides beyond the barrel A, so that it forms a protection against the rain, and that it is not necessary to take in the wind-sail if it rains.

By referring to Fig. 1 of the drawings it will be noticed the wings extend to some distance beyond the circumference of the barrel, and they also rise above the top edge thereof, and the effective area of said wings may be increased to any extent.

A wind-sail is thus obtained which requires no change in its position, and which catches the wind from whatever quarter the same may blow; and, furthermore, a comparatively large quantity of air is carried down through the barrel, and in case of rain the wind-sail may remain in position, being protected by its top.

I claim as new and desire to secure by Letters Patent—

1. A wind-sail provided with four or more wings and center partitions or gores C, substantially as and for the purpose described.

2. Providing the wind-sail with a top which extends beyond the circumference of the barrel, substantially as and for the purpose set forth.

JOHN C. RAYMOND.

Witnesses:
   WM. F. MCNAMARA,
   ALEX. F. ROBERTS.